United States Patent [19]
White

[11] Patent Number: 5,190,379
[45] Date of Patent: Mar. 2, 1993

[54] BEARINGS FOR ROLLER CUTTER ASSEMBLY

[75] Inventor: Kenneth M. White, Calgary, Canada

[73] Assignee: Western Rock Bit Company, Ltd., Calgary, Canada

[21] Appl. No.: 891,209

[22] Filed: Jun. 1, 1992

[30] Foreign Application Priority Data

Jun. 3, 1991 [CA] Canada ............................... 2043781

[51] Int. Cl.$^5$ ...................... E21B 10/24; F16C 17/04
[52] U.S. Cl. .................... 384/246; 175/325.3; 384/92
[58] Field of Search ............... 384/92, 98, 246, 244, 384/416, 418; 175/325.3

[56] References Cited

U.S. PATENT DOCUMENTS

| | | |
|---|---|---|
| 1,812,044 | 6/1931 | Grant . |
| 2,134,095 | 10/1938 | Abegg . |
| 2,138,007 | 11/1938 | Howard et al. . |
| 2,189,031 | 2/1940 | Harrington . |
| 2,189,033 | 2/1940 | Book et al. . |
| 2,189,039 | 2/1940 | Childs . |
| 2,189,040 | 2/1940 | Jones . |
| 2,260,366 | 10/1941 | Childs . |
| 2,633,544 | 3/1953 | Herr ............................... 384/246 X |
| 2,894,439 | 7/1959 | Burger et al. .................. 384/246 X |
| 3,825,312 | 7/1974 | Allaben, Jr. ........................ 384/538 |
| 3,907,048 | 9/1975 | Gray .................................. 175/325.3 |
| 4,231,437 | 11/1980 | Swersky et al. ................. 175/325.3 |
| 4,378,058 | 3/1983 | Allison .............................. 384/92 X |

FOREIGN PATENT DOCUMENTS

| | | |
|---|---|---|
| 803877 | 1/1969 | Canada . |
| 1016534 | 8/1977 | Canada . |
| 1174662 | 9/1984 | Canada . |

Primary Examiner—Thomas R. Hannon
Attorney, Agent, or Firm—Hoffman, Wasson & Gitler

[57] ABSTRACT

A roller cutter assembly for a roller reamer which can be attached to a drill string is formed of a cylindrical body having an integral tapered bearing pin at each end. A journal bearing block for each bearing pin can be secured to the roller reamer by welding so as to hold the cutter rotatably on the reamer. The bearing block has a diameter slightly larger than that of the bearing pin. The angle of taper of the bearing pins and bearing surfaces is greater than the arc tangent of the coefficient of static friction between the coacting bearing surfaces such that the bearing pins do not self-lock in the bearing blocks.

12 Claims, 2 Drawing Sheets

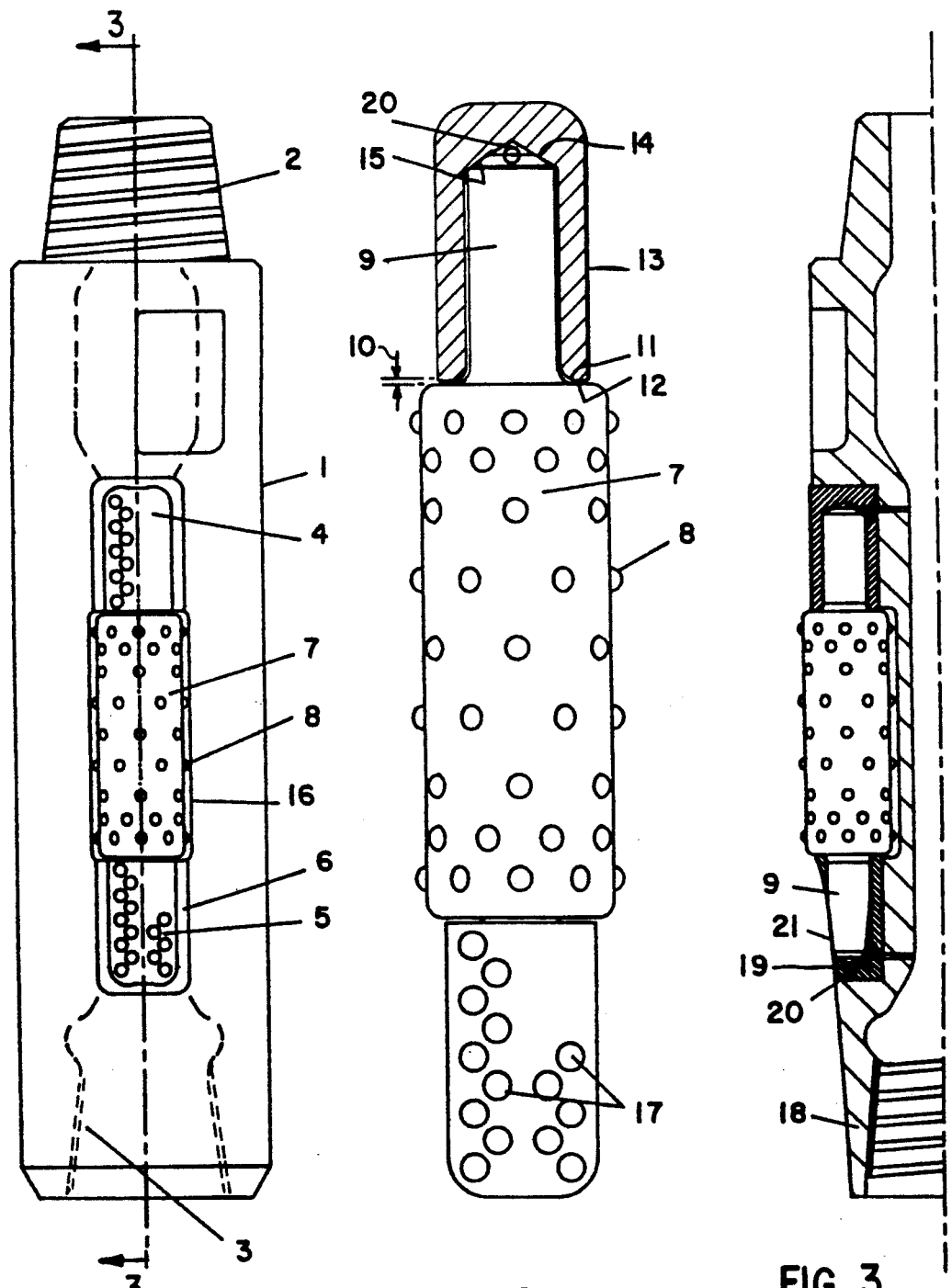

BEARINGS FOR ROLLER CUTTER ASSEMBLY

BACKGROUND OF THE INVENTION

This invention relates to reamer stabilizers, and more particularly has to do with extending the life of the roller reamer stabilizer cutter bearings as would be utilized in an air drilling operation such as mining blast hole drilling.

It has been the practice to use expendable reamers having a balanced life such as the life of the body of the unit matches the life of the roller cutters. Canadian Patent No. 1,016,534 which issued on Aug. 30, 1977 to Western Rock Bit Company Limited discloses a means to significantly extend the life of the roller cutters and hence the life of the tool. The use of integral bearing pins having self-centering means has virtually eliminated roller end wear and has proven to be very effective in lowering air loss through the bearings as compared to axle mounted type roller cutters. Due to the extension of the life of the roller cutters on these tools body wear and hence the associated bearing block wear has become a problem.

SUMMARY OF THE INVENTION

The invention is directed towards a means to extend the life of the bearing surfaces and therefore the total life of the tool.

According to a broad aspect, the present invention provides for use in a roller reamer adapted for releasable attachment to a drill string, a roller cutter assembly comprising: a cylindrical body having an integral tapered bearing pin at each end of the body and a journal bearing block for each of the bearing pins, a tapered bearing surface in each bearing block of a diameter slightly larger than that of the associated bearing pin, the angle of taper of the bearing pins and bearing surfaces being greater than the arc tangent of the coefficient of static friction between the coacting bearing surfaces on the roller and bearing block such that the bearing pins do not self-lock in the bearing blocks.

According to a more specific aspect, the invention provides for use in a roller reamer adapted for releasable attachment to a drill string of the type in which air flows through a center bore in the drill string and drill bit cuttings are removed up an annular space between a borehole and the drill string, a roller cutter assembly comprising: a cylindrical body having an integral tapered bearing pin at each end, a journal bearing block for each of the bearing pins, a tapered bearing in each bearing block of a diameter slightly larger than that of the associated bearing pin, the angle of taper of the bearing pins and bearing surfaces being greater than the arc tangent of the coefficient of static friction between the coacting bearing surfaces on the roller and bearing block such that the bearing pins do not self-lock in the bearing blocks, and air passage means in the bearing blocks whereby, when the assembly is installed in a roller reamer, air may pass from the center bore into the bearing blocks for air lubrication of the bearings.

Preferably, the cylindrical body is provided with annular rows of tungsten carbide inserts and each bearing pin being joined to the cylindrical body by a transitionary surface substantially perpendicular to the longitudinal axis of the body and the transitionary surface forming a secondary thrust face which has a minor diameter coinciding with the major diameter of the associated bearing pin.

In this preferred embodiment, the roller cutter bearing pins have at their outer longitudinal extremities a primary thrust face, the thrust faces when acted upon by the air, aiding in centralizing the roller cutter between the journal bearing blocks.

The primary thrust face is preferably provided with self-centering means consisting of a convex conical primary thrust face mating with a mating concave conical thrust face in the journal bearing block and the air passage means terminates substantially at the apex of the concave conical thrust face.

BRIEF DESCRIPTION OF THE DRAWINGS

The invention will now be described in greater detail with reference to the accompanying drawings, in which:

FIG. 1 illustrates the general configuration of a known roller reamer;

FIG. 2 is a partial section of an assembled roller and bearing block combination of the type used in FIG. 1;

FIG. 3 is a longitudinal section taken on line A—A in FIG. 1 and showing the worn configuration of the prior art roller reamer bearing block, roller combination shown as would be common in the box thread area;

DESCRIPTION OF THE PREFERRED EMBODIMENTS

Figure 5:
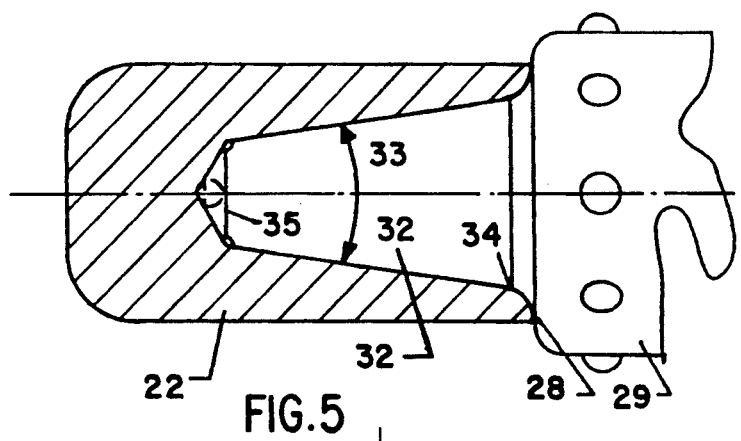
FIG. 5 is an enlarged view of the bearing block area of FIG. 4 illustrating the various angular relationships between coacting bearing surfaces.

Referring to FIG. 1, the reamer body 1 is provided with a pin end 2 threaded for releasable attachment to the drill string and a box end 3 for attachment to the drill bit. Bearing blocks 4 and 5 are attached by welding 6 to the reamer body 1. The roller cutter 7 is provided with tungsten carbide inserts as shown at 8 and has an integral bearing pin 9 at each end of the roller cutter body. Recesses are provided in the body 1 for three roller cutters like 7 such that they are spaced 120° relative to one another and are free to rotate.

The assembled prior art roller and block combination shown in FIG. 2 illustrates the gap 10 between the secondary thrust face 11 on the bearing block 13 and the secondary thrust face 12 which is formed as a transitionary surface between the pin 9 and the cutter body. This gap is approximately 1/64" (0.397 mm) in the new condition. The sectioned block 13 shows the primary thrust face 14 on the block mating with the primary thrust face 15 on the bearing pin 9. The primary thrust face 15 on the roller cutter pin 9 is an integral part of the pin and is formed with an angled end of approximately 120°; this is to coact with the surface in the bearing block as would be formed by a drill bit that would be used for drilling the bearing pin hole in the bearing block 13. This configuration of mating surfaces on the primary thrust faces provides self-centering operation of the bearing pin in the journal bearing block.

Air lubrication is provided for each bearing pin on the roller cutter through a hole 20 shown in FIGS. 2 and 3. A corresponding hole is drilled into the center annulus of the reamer body to bleed enough air therefrom to keep the bearing surfaces and thrust faces free from foreign materials. Air lubrication hole 20 in the bearing block should be drilled such that its termination is approximately at the apex of 120° primary thrust face as shown in the sectioned block of FIGS. 2 and 3.

Protection against abrasive wear of the bearing blocks as in FIG. 2 is made on the outer surfaces of the bearing blocks with tungsten carbide inserts as shown at 17. These inserts, though very effective, eventually wear away and the condition appearing in FIG. 3 occurs. FIG. 3 indicates a typical wear pattern at 18 where substantial outside diameter abrasion has occurred in the area of the box thread. The box end bearing block at 19 has worn through exposing the bearing pin 9 such that air loss through air bleed hole 20 is unrestricted and rapid wear of the bearing pin commences. Roller reamer stabilizers that have suffered a wear through on the bearing blocks show a characteristic tapered type of wear on the bearing pin as indicated at 20. Stabilizers that do not suffer from a wear through generally have a substantial amount of wearing life left when the roller gauge surface is worn out.

Figure 4:
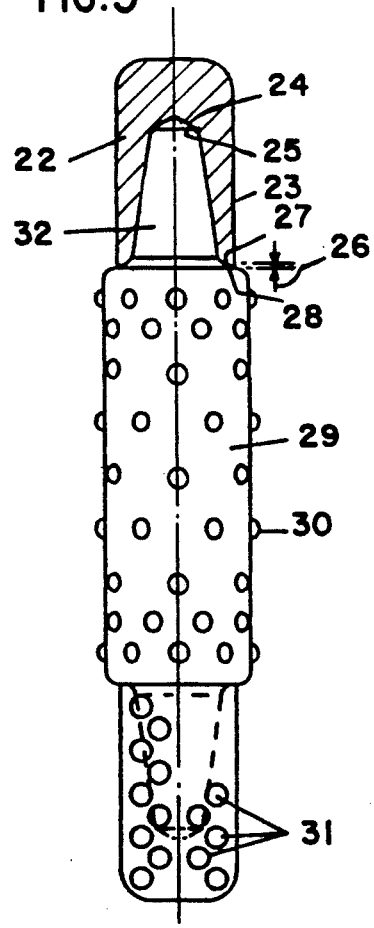
FIG. 4 is a cross-sectional view of a bearing block, roller bearing pin combination constructed according to the present invention.

The inventive roller bearing block combination shown in FIG. 4 consists of bearing block 22 having a tapered bearing bore 23, with a conical primary thrust surface 24 which coacts with the primary thrust surface 25 on bearing pin 32 of roller 29. Secondary thrust surface 27 of bearing block 22 is spaced apart from the coacting roller secondary thrust surface 28 by distance 26. Tungsten carbide inserts 30 are provided on the roller 29 in a known geometrical relationship. Wear inserts, also tungsten carbide, are provided on the bearing blocks generally as indicated at 31.

FIG. 5 illustrates an enlarged view of the bearing block area of FIG. 4 and common numerical description is used. By way of example a standard 9⅞" borehole reamer stabilizer will be used for dimensional description. In this size of tool the bearing block 22 is manufactured from a low carbon carburizing grade of steel typically 2½" square stock. The roller is manufactured from 3" round bar stock, also a carburizing grade of steel having higher impact properties than the block. The blocks and roller material are generally A.I.S.I. 8720 and 4815 material respectively. The tapered bearing pin 32 on roller 29 has a total taper angle that is greater than the arc tangent of the coefficient of static friction between the coacting bearing surfaces on the roller and the bearing block. Basically the taper angle is such that the roller bearing pin 32 is not self-locking in the bearing block bore for the normal range of friction coefficients encountered. A standard self-releasing taper that is used for the sample size reamer stabilizer is an American Standard #40 taper. This taper is 3½" per foot on diameter giving a total included angle of 16°15'36.7" which would correspond to a coefficient of static friction of 0.2916 which is in the range of 0.1 to 0.3 for air lubricated steel on steel bearing surfaces. The gauge point diameter of this taper is 1.75" which corresponds to the tangency start point of the stress reduction radius between the bearing pin gauge diameter at 34 and the secondary thrust face 28. Using the standard dimensions of a #40 taper the minor conical diameter of the bearing pin at 32 will be 0.9661". This yields a truncated conical bearing surface of 2.6875" and a diametrical difference of 0.784". The critical break through dimension on the bearing block from the prior art configuration has increased from 0.5" to 0.767" thus significantly increasing the life of the bearing block roller combination. The use of an American Standard taper on the bearing pin and bore is not a prerequisite of the inventive taper pin roller bearing block combination; the primary consideration is that the pin not be self-locking in the bearing block. A satisfactory relationship between the nominal bearing clearance and the secondary thrust face clearance of 1/64" has proven to be 0.010" diametrical. This clearance factor requires that the alternating wear relationship of primary to secondary thrust face go through 2 cycles before the tapered bearing pin and block bore come into the dimensional range of contact. Usually there is wear at this stage on the main bearing surfaces such that a locking condition does not occur even when the coefficient of friction exceeds the maximum 0.3 value. The primary thrust face relationships between the bearing block and the bearing pin are as per prior art.

Figure 6:
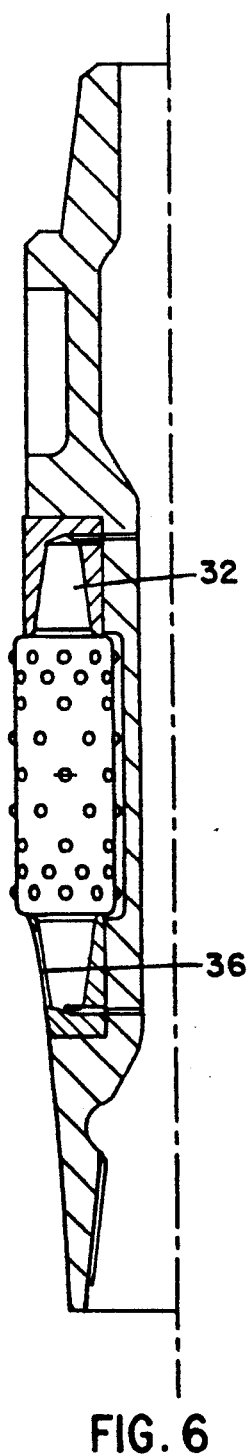
FIG. 6 is a longitudinal sectional view of the inventive roller and bearing block combination shown mounted into a reamer body that is worn an amount equivalent to that shown in FIG. 3.

FIG. 6 indicates at 36 the inventive bearing block roller bearing pin combination has not worn through at a time when the prior art combination would be considered worn out.

I claim:

1. For use in a roller reamer adapted for releasable attachment to a drill string, a roller cutter assembly comprising: a cylindrical body having an integral tapered bearing pin at each end of the body and a journal bearing block for each of the bearing pins, a tapered bearing surface in each bearing block of a diameter slightly larger than that of the associated bearing pin, the angle of taper of the bearing pins and bearing surfaces being greater than the arc tangent of the coefficient of static friction between the coacting bearing surfaces on the roller and bearing block such that the bearing pins do not self-lock in the bearing blocks.

2. For use in a roller reamer adapted for releasable attachment to a drill string of the type in which air flows through a center bore in the drill string and drill bit cuttings are removed up an annular space between a borehole and the drill string, a roller cutter assembly comprising: a cylindrical body having an integral tapered bearing pin at each end, a journal bearing block for each of the bearing pins, a tapered bearing in each bearing block of a diameter slightly larger than that of the associated bearing pin, the angle of taper of the bearing pins and bearing surfaces being greater than the arc tangent of the coefficient of static friction between the coacting bearing surfaces on the roller and bearing block such that the bearing pins do not self-lock in the bearing blocks, and air passage means in the bearing blocks whereby, when the assembly is installed in a roller reamer, air may pass from the center bore into the bearing blocks for air lubrication of the bearings.

3. The assembly defined in claim 2 in which said cylindrical body is provided with annular rows of tungsten carbide inserts and each bearing pin being joined to the cylindrical body by a transitionary surface substantially perpendicular to the longitudinal axis of the body and said transitionary surface forming a secondary thrust face which has a minor diameter coinciding with the major diameter of the associated bearing pin.

4. The assembly defined in claim 3 in which said roller cutter bearing pins have at their outer longitudinal extremities a primary thrust face, said thrust faces when acted upon by said air, aiding in centralizing the roller cutter between the journal bearing blocks.

5. The assembly defined in claim 4 in which the primary thrust face is provided with self-centering means consisting of a convex conical primary thrust face mating with a mating concave conical thrust face in said journal bearing block.

6. The assembly defined in claim 5 in which said air passage means terminates substantially at the apex of the concave conical thrust face.

7. A roller reamer having a threaded end for releasable attachment to a tubular drill string and a threaded box end for releasable attachment to a drill bit, the roller reamer comprising a tubular body provided on an outer surface thereof with a plurality of axially extending, circumferentially spaced recesses and a plurality of roller reamer cutter assemblies each of which comprises a cylindrical body having an integral tapered bearing pin at each end of the body and a journal bearing block for each of the bearing pins, a tapered bearing surface in each bearing block of a diameter slightly larger than that of the associated bearing pin, the angle of taper of the bearing pins and bearing surfaces being greater than the arc tangent of the coefficient of static friction between the coacting bearing surfaces on the roller and bearing block such that the bearing pins do not selflock in the bearing blocks, each roller cutter assembly being accommodated in a respective one of the plurality of recesses such that the cylindrical body projects partly out of the recess and the journal bearing blocks of each roller cutter assembly being secured to the tubular body.

8. The roller reamer defined in claim 7 wherein the journal bearing blocks are each provided with lubrication air passage means respectively communicating with complementary air passage means extending generally radially through the tubular body into a centre bore thereof.

9. The assembly defined in claim 8 in which said cylindrical body is provided with annular rows of tungsten carbide inserts and each bearing pin being joined to the cylindrical body by a transitionary surface substantially perpendicular to the longitudinal axis of the body and said transitionary surface forming a secondary thrust face which has a minor diameter coinciding with the major diameter of the associated bearing pin.

10. The assembly defined in claim 9 in which said roller cutter bearing pins have at their outer longitudinal extremities a primary thrust face, said thrust faces when acted upon by said air, aiding in centralizing the roller cutter between the journal bearing blocks.

11. The assembly defined in claim 10 in which the primary thrust face is provided with self-centering means consisting of a convex conical primary thrust face mating with a mating concave conical thrust face in said journal bearing block.

12. The assembly defined in claim 11 in which said air passage means in the journal bearing blocks terminates substantially at the apex of the concave conical thrust face.

* * * * *